US012638420B2

(12) United States Patent
    Lenglachner

(10) Patent No.:    US 12,638,420 B2
(45) Date of Patent:      May 26, 2026

(54) ULTRASONIC TESTING DEVICE

(71) Applicant: FACC AG, Ried im Innkreis (AT)

(72) Inventor: Wolfgang Lenglachner, Braunau am Inn (AT)

(73) Assignee: FACC AG, Ried im Innkreis (AT)

( * ) Notice: Subject to any disclaimer, the term of this patent is extended or adjusted under 35 U.S.C. 154(b) by 392 days.

(21) Appl. No.: 18/004,024

(22) PCT Filed: Dec. 1, 2021

(86) PCT No.: PCT/AT2021/060456
    § 371 (c)(1),
    (2) Date: Dec. 30, 2022

(87) PCT Pub. No.: WO2022/115893
    PCT Pub. Date: Jun. 9, 2022

(65) Prior Publication Data
    US 2023/0314378 A1      Oct. 5, 2023

(30) Foreign Application Priority Data

Dec. 1, 2020    (AT) .............................. A 51048/2020

(51) Int. Cl.
    *G01N 29/04*          (2006.01)
    *B05B 1/34*           (2006.01)
        (Continued)

(52) U.S. Cl.
    CPC ........... *G01N 29/04* (2013.01); *B05B 1/3402* (2018.08); *B05B 13/0431* (2013.01); *G01N 29/32* (2013.01); *G01N 2291/0231* (2013.01)

(58) Field of Classification Search
    CPC ........ G01N 29/04; G01N 29/32; G01N 29/28; G01N 2291/0231; B05B 1/34; B05B 1/02; B05B 13/0431
        (Continued)

(56) References Cited

U.S. PATENT DOCUMENTS 2,221,455 A    11/1940   Ohlinger
3,486,700 A    12/1969   Bristow
        (Continued)

FOREIGN PATENT DOCUMENTS

CN          103149009 A      6/2013
EP            0119096 A2     9/1984
        (Continued)

OTHER PUBLICATIONS

Non-Destructive Condition Assessment of Fiberglass Reinforced Structures , Geoffrey. (Year: 2015).*
        (Continued)

*Primary Examiner* — Jacques M Saint Surin
(74) *Attorney, Agent, or Firm* — McCoy Russell LLP

(57)      ABSTRACT

The invention relates to an ultrasonic testing device and to a method for nondestructively testing a component, in particular a fiber-plastic composite component, having: an ultrasonic testing head; and a liquid nozzle with a liquid inlet, a liquid outlet, and an inner surface which tapers towards the liquid outlet, wherein the liquid nozzle has at least one liquid guiding rib which protrudes inwards into the sound chamber from the tapering inner surface of the liquid nozzle upstream of the ultrasonic testing head.

13 Claims, 6 Drawing Sheets

(51) Int. Cl.
    *B05B 13/04*         (2006.01)
    *G01N 29/32*       (2006.01)

(58) Field of Classification Search
    USPC .......................................................... 73/632
    See application file for complete search history.

(56)            References Cited

U.S. PATENT DOCUMENTS

| | | | |
|---|---|---|---|
| 4,026,143 A | 5/1977 | Holland | |
| 4,393,991 A | 7/1983 | Jeffras et al. | |
| 5,426,980 A * | 6/1995 | Smith | G01N 29/28 |
| | | | 73/632 |
| 5,431,342 A * | 7/1995 | Saripalli | B05B 17/0607 |
| | | | 239/589 |
| 5,779,099 A * | 7/1998 | D'Andrade | B05B 1/3402 |
| | | | 239/590.5 |
| 7,607,594 B2 * | 10/2009 | Saripalli | B05B 1/00 |
| | | | 73/644 |
| 10,352,911 B2 * | 7/2019 | Fischer | G01N 29/2418 |
| 10,962,506 B2 * | 3/2021 | Palmer | G01N 29/262 |
| 2004/0144867 A1 | 7/2004 | Ferrazza et al. | |

FOREIGN PATENT DOCUMENTS

| | | | |
|---|---|---|---|
| EP | 2992964 | A1 | 3/2016 |
| GB | 191514014 | A | 3/1919 |
| GB | 1419118 | A | 12/1975 |
| JP | S57142358 | U | 9/1982 |
| JP | 2015021742 | A | 5/2018 |
| KR | 101377454 | B1 | 4/2014 |
| RU | 2359264 | C1 | 6/2009 |

OTHER PUBLICATIONS

Federal Institute of Industrial Property (FIPS), Office Action and Search Report Issued in Application No. 2022133879/04(073762), Jun. 13, 2023, 24 pages. (Submitted with Partial Machine Translation).

ISA European Patent Office, International Search Report Issued in Application No. PCT/AT2021/060456, Jan. 25, 2022, WIPO, 6 pages.

* cited by examiner

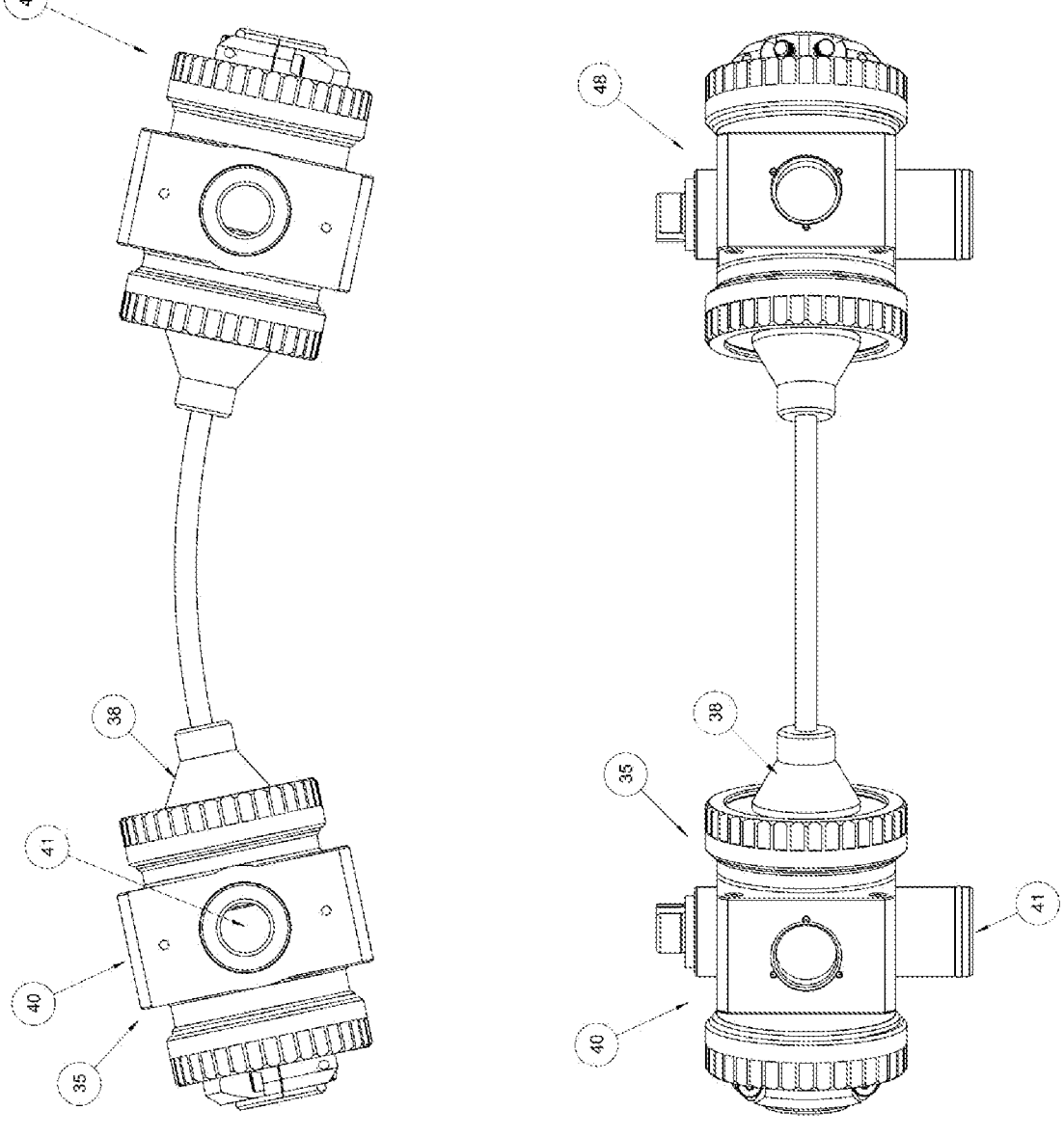
FIGURE 3                    FIGURE 4

ULTRASONIC TESTING DEVICE

CROSS REFERENCE TO RELATED APPLICATIONS

The present application is a U.S. National Phase of International Application No. PCT/AT2021/060456 entitled "ULTRASONIC TESTING DEVICE," and filed on Dec. 1, 2021. International Application No. PCT/AT2021/060456 claims priority to Austrian Patent Application No. A 51048/2020 filed on Dec. 1, 2020. The entire contents of each of the above-listed applications are hereby incorporated by reference for all purposes.

TECHNICAL FIELD

The invention relates to an ultrasonic testing device for non-destructively testing a component, in particular a fibre-reinforced plastic component, having:
an ultrasonic testing head,
a liquid nozzle with a liquid inlet, a liquid outlet, and an inner surface which tapers towards the liquid outlet.
The invention further relates to a method for non-destructively testing a component, in particular a fibre-reinforced plastic component.

BACKGROUND AND SUMMARY

JP S57142358 U discloses an ultrasonic testing device having an ultrasonic testing head and a liquid nozzle, in which the liquid is supplied to the liquid nozzle radially via a supply line, flows approximately perpendicular to the front of the ultrasonic testing head, and exits the nozzle via an outlet. In this prior art, guiding ribs are also provided but extend only along the liquid supply. These guiding ribs end outside the testing head and therefore do not extend in front of the testing head. This prior art thus only makes it possible to reduce turbulence in the water supply. The flow in front of the testing head is not improved.

U.S. Pat. No. 3,486,700 A and US 2004/144867 A1 describe different types of nozzles, which would also not be compatible with ultrasonic testing devices as disclosed in JP S57142358 U.

As described further in EP 0 119 096 A2, ultrasonic probes are used for non-destructively testing materials and components. For example, inhomogeneities and defects within the components can be located in this way. The ultrasonic transducer emits ultrasonic waves, which are transferred to the component by a jet of liquid. The jet of liquid is shaped by a liquid nozzle, which is fastened to the housing of the ultrasonic probe in front of the transducer. Depending on the design, the reflected ultrasonic waves can be received at the same ultrasonic transducer ("pulse echo mode"), or the ultrasonic waves pass through the component and are supplied to a receiver transducer via a second jet of liquid ("through transmission mode"). The incident waves are converted into an electrical signal, which is evaluated electronically. This prior art also addresses the problem of the water flow being subjected within the ultrasonic probe to various disturbances, which can adversely affect the ultra-sonic signal. For this reason, EP 0 119 096 A2 proposes equipping the housing of the ultrasonic probe with a plurality of channels which are spaced from each other in the circumferential direction and extend in the flow direction and via which the liquid is conducted in the direction of the liquid nozzle. These channels are supposed to help achieve straight and laminar flow of the liquid.

In practice, however, it has been found that this approach can at best maintain the laminar character of the flow in the stationary state of the ultrasonic probe. The flow in front of the transducer is hardly improved. When components with three-dimensional geometries are tested, the ultrasonic probe must also execute complicated movements, in par-ticular rotations. In the prior art, these rotations must be carried out very slowly to avoid turbulence and the resulting impairment of the signal. This problem is made worse by the fact that the testing of narrow component contours requires short ultrasonic probes, which are particularly susceptible to turbulence resulting from rotations. In contrast, the liquid channels of EP 0 119 096 A2 even lengthen the ultrasonic probe.

GB 1 419 118 A describes an ultrasonic testing device in which a laminar flow is intended to be improved by parallel tubes extending in the flow direction in the flow cross-section. The tubes are arranged upstream of a nozzle for water exit, as seen in the flow direction. This prior art has substantially the same disadvantages as EP 0 119 096 A2. The length of the ultrasonic probe is increased by the tubes. Also, the water flow can only be kept laminar in the static state.

Against this background, the object of the present inven-tion consists in moderating or overcoming at least some disadvantages of the prior art. The invention preferably aims to allow efficient testing of components with three-dimen-sional geometry.

This object is achieved by an ultrasonic testing device having the features of claim 1 and a method according to claim 13. Preferred embodiments of the invention are speci-fied in the dependent claims.

According to the invention, the liquid nozzle has at least one liquid-guiding rib, which protrudes inwards from the tapering inner surface of the liquid nozzle into the sound chamber in front of the ultrasonic testing head.

At least one liquid-guiding rib thus protrudes from the smooth, elevation-free inner surface into the interior of the liquid nozzle. As a result, the liquid flow can be kept largely laminar not only in the static state of the ultrasonic testing device but also during a movement of the ultrasonic testing device. Movements of the ultrasonic testing device can thus be carried out at a higher speed than in the prior art without seriously impairing the measurement signal. Advanta-geously, the results of the component testing can thus be substantially improved and the testing can be accelerated. Since the liquid-guiding rib extends along the inner surface of the liquid nozzle which tapers towards the front, the length of the liquid nozzle, i.e., its axial extent, can be kept short. This makes it possible to test narrow and highly curved components.

Thanks to the liquid-guiding rib, the testing can be carried out reliably and precisely during the necessary movements and rotations of the liquid nozzle, even with complicated three-dimensional component geometries. It is also advan-tageous if the flow speed of the liquid, in particular water, can be kept substantially constant up to the liquid outlet.

To avoid undesirable reflections of the ultrasonic signal, it is favourable if the liquid-guiding rib extends from the tapering inner surface into an edge region on the front of the ultrasonic testing head, while a central region on the front of the ultrasonic testing head is free of the liquid-guiding rib. Accordingly, the liquid-guiding rib ends in the edge region, as seen in the radial direction, of the sound chamber in front of the ultrasonic testing head and does not protrude into the central region of the sound chamber in front of the ultrasonic testing head, which extends around the central centre axis of the liquid nozzle. In contrast, the rib in the prior art according to JP 557142358 U does not extend into the sound chamber in front of the testing head.

In a preferred embodiment, to ensure laminar liquid flow along the inner surface which tapers in the axial direction towards the liquid outlet, the liquid nozzle has multiple liquid-guiding ribs on the tapering inner surface.

To ensure that the measurement signal is impaired as little as possible by the liquid-guiding ribs, it is advantageous when the inner longitudinal edges of opposing liquid-guiding ribs are arranged at a radial distance from one another so that the liquid nozzle has a central region free of liquid-guiding ribs. The liquid-guiding ribs thus do not define individual, closed flow channels but are joined together via the open central region.

When the liquid-guiding ribs are arranged at regular angular intervals, as seen in the circumferential direction of the inner surface, on the tapering inner surface of the liquid nozzle, the liquid flow can be kept substantially laminar in the case of displacements and rotations in different directions and axes.

In a preferred embodiment, the height of the liquid-guiding ribs decreases towards the liquid outlet. Therefore, the wider the flow cross-section within the inner surface of the liquid nozzle tapering towards the liquid outlet, the higher the liquid-guiding ribs. This embodiment has proven particularly effective in improving the laminar flow without substantially impairing the ultrasonic signal.

When the inner longitudinal edges of the liquid-guiding ribs run substantially parallel to one another, a substantially cylindrical central region is created, in which the liquid can flow unhindered. The flow conditions and the ultrasonic signal are optimised thereby. This embodiment has proven particularly effective in reducing or eliminating side lobes of the sound field.

In an alternative embodiment, the radial distance between opposing liquid-guiding ribs decreases in the axial direction towards the liquid outlet. In this embodiment, therefore, the liquid ribs protrude inwards less far on the side of the ultrasonic testing head. This embodiment can be provided in a multi-frequency ultrasonic testing head to maintain the side lobes of the sound field.

In a preferred embodiment, the tapering inner surface of the liquid nozzle adjacent to the liquid outlet is free of liquid-guiding ribs. Since the flow cross-section close to the liquid outlet is comparatively small, the liquid-guiding ribs can be omitted in this portion.

In a preferred embodiment, to optimise the flow conditions, the inner surface of the liquid nozzle is tapered according to a spline polynomial of degree 3 to 5. This embodiment has proven particularly favourable for achieving a laminar flow in the stationary state of the liquid nozzle. Thanks to the liquid-guiding rib, this laminar liquid flow can be maintained even when there are displacements and rotations of the liquid nozzle.

To test narrow or highly curved regions of a component, it is favourable when the liquid nozzle has an axial extent of less than 60 mm from the centre of the ultrasonic testing head to the liquid outlet. In a preferred embodiment, a drive is provided to move the liquid nozzle, in particular to rotate the liquid nozzle about its longitudinal axis and/or a transverse axis running perpendicular thereto.

In a preferred embodiment, a liquid supply is provided, with which a liquid flow, in particular water, is supplied to an annular feed between a receiving housing and the outside of the liquid nozzle, deflected with a deflecting ring, and guided to the liquid inlet of the liquid nozzle. The liquid inlet extends in a ring on the rear of the liquid nozzle. The inflow of the liquid flow is made laminar by the annular liquid inlet.

Preferably, the rear end (as seen in the flow direction of the liquid) of the liquid-guiding rib is situated inside the liquid inlet. From the rear end, the liquid-guiding rib extends forwards (as seen in the flow direction of the liquid) into the sound chamber in front of the testing head.

In a preferred application, a testing system is provided with a manipulation element, in particular with a robot arm, to which a tool with an ultrasonic testing device according to one of the above-described embodiments is attached.

In a preferred embodiment, a further ultrasonic testing device with a further ultrasonic testing head and a further liquid nozzle is provided to receive ultrasonic waves passing through the component. The further ultrasonic testing device is preferably designed like the ultrasonic testing device according to one of the above-explained embodiments. The ultrasonic testing head transmits the ultrasonic waves; the further ultrasonic testing head receives the ultrasonic waves on the opposite side of the component. In this embodiment, the ultrasonic testing head and the further ultrasonic testing head are coupled to one another via the liquid jets, which are applied to opposing sides of the components via the liquid nozzles. Sound transmission through the component can thus be carried out.

Depending on the embodiment, the further ultrasonic testing device can be arranged on a further manipulation element or, in particular with the aid of a fork element, on the manipulation element.

In a further embodiment, the ultrasonic testing device is designed to receive reflected sound waves. A reflected sound method can thus be carried out. This embodiment can be provided additionally or alternatively to through-transmission with the aid of the further ultrasonic testing device.

To carry out a method according to the invention for non-destructively testing a component, in particular a fibre-reinforced plastic component, the following steps are therefore carried out (not necessarily in the stated order):

providing the ultrasonic testing device in one of the
      above-described variants,
   generating ultrasonic waves using the ultrasonic testing
      head,
   supplying a liquid flow into the liquid nozzle via the liquid
      inlet,
   conducting the liquid flow along the inner surface of the
      liquid nozzle to the liquid outlet, wherein the liquid
      flow is guided with the aid of the liquid-guiding rib.
   The method preferably also comprises the step of:
   providing a further ultrasonic testing device, which is
      preferably designed like the ultrasonic testing device in
      one of the above variants;
   receiving ultrasonic waves passing through the compo-
      nent using a further ultrasonic testing head of the
      further ultrasonic testing device.
   In this embodiment, the ultrasonic waves pass through the component and are supplied via a second liquid jet to the further ultrasonic testing head ("through transmission mode").

Alternatively or additionally, the ultrasonic waves reflected in the component can be detected using the ultrasonic testing device.

In a preferred embodiment, the method for non-destructively testing the component also comprises the step of:
   rotating the liquid nozzle, in particular about its own axis,
      while the liquid flow is conducted along the inner
      surface of the liquid nozzle to the liquid outlet, so that the liquid flow is carried over the liquid-guiding rib during the rotary movement.

BRIEF DESCRIPTION OF THE FIGURES

The invention is explained further below using a preferred exemplary embodiment, which is shown in the drawings.

FIG. 3, FIG. 4 and FIG. 5 show a tool head of the tool according to FIG. 2A to FIG. 2C, opposite which there is a corresponding ultrasonic probe with a receiver transducer.

DETAILED DESCRIPTION

Figure 1:
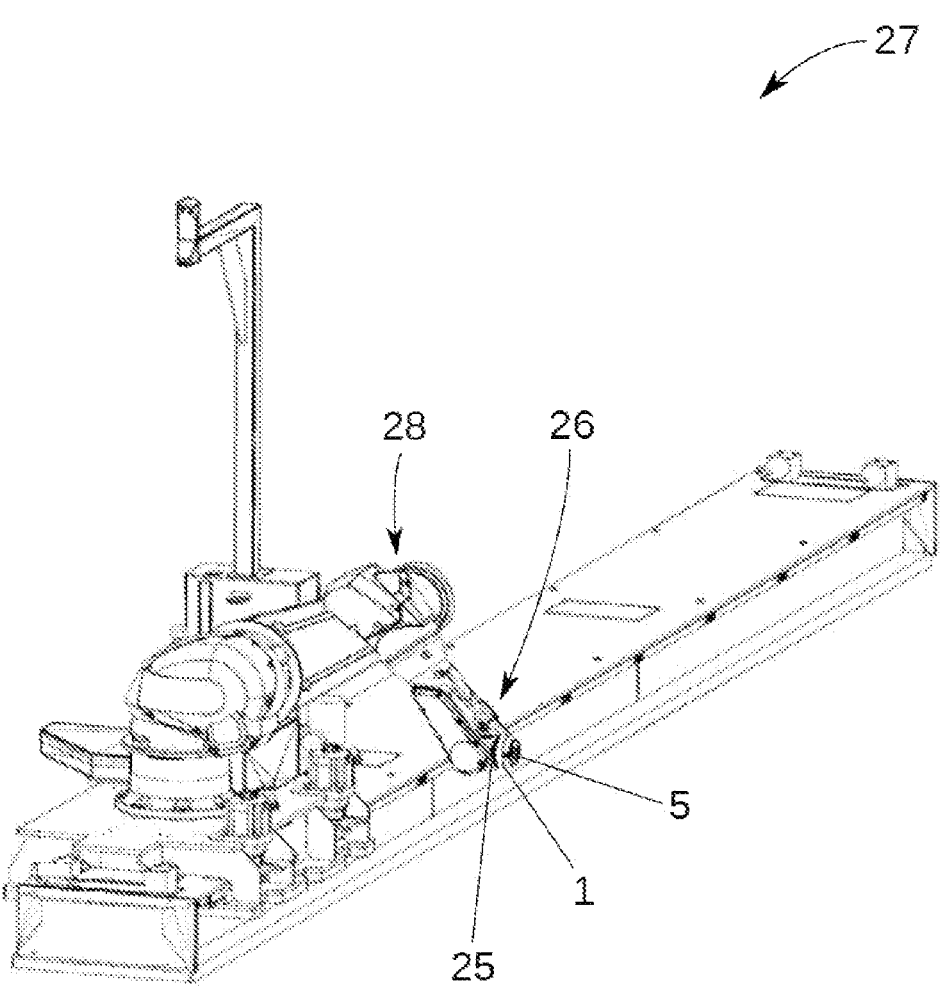
FIG. 1 shows a testing system for non-destructively testing a fibre-reinforced plastic component.

FIG. 1 shows a testing system 27 for non-destructively testing a fibre-reinforced plastic component. The testing system has a change-over device 26, an adapter plate 25, and a manipulation element 28, which is in the form of a robot arm in the embodiment shown. The adapter plate 25 is mounted on the manipulation element 28 on one side. The change-over device 26 is connected detachably to the other side of the adapter plate 25.

Figure 2A:
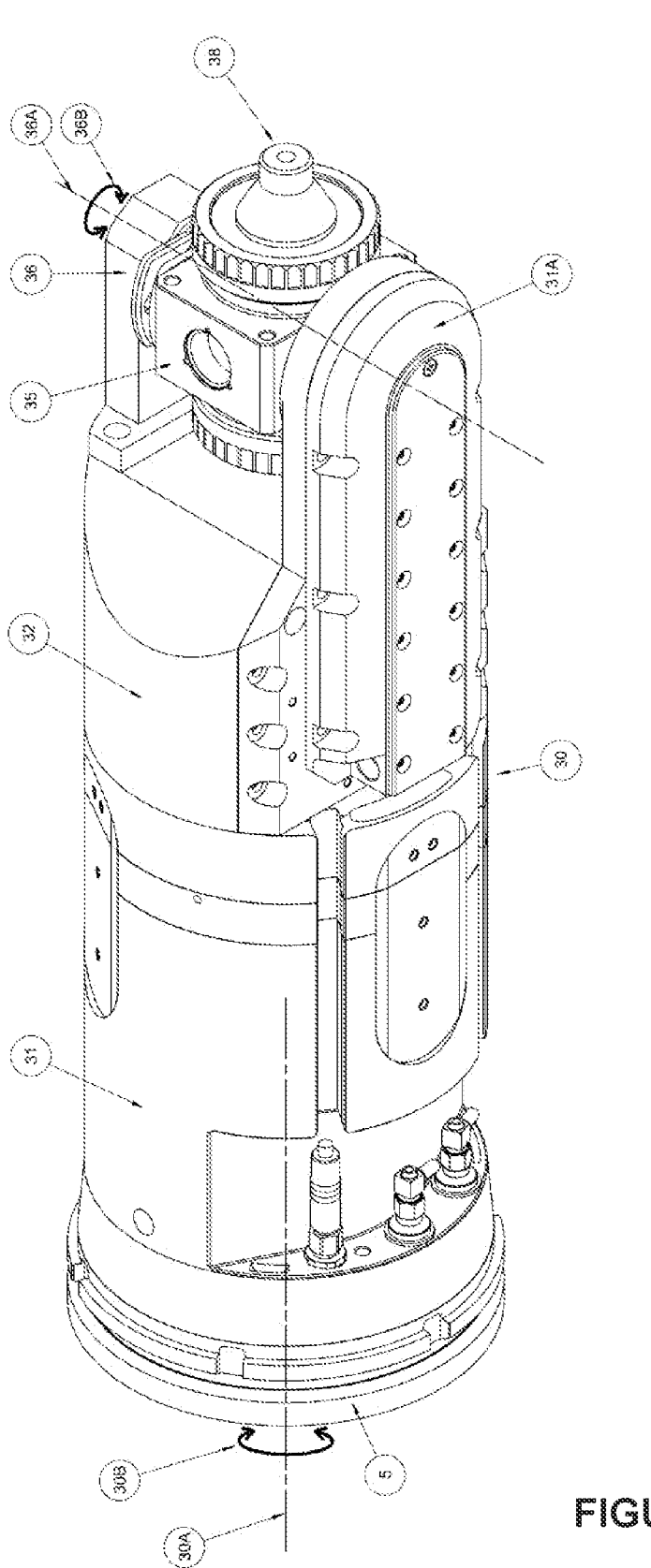
FIG. 2A to 2C show a change-over device of the testing system according to FIG. 1 with a change-over adapter and a tool mounted thereon for non-destructively testing the fibre-reinforced plastic component, the tool having an ultrasonic testing device according to the invention.
Figure 2B:
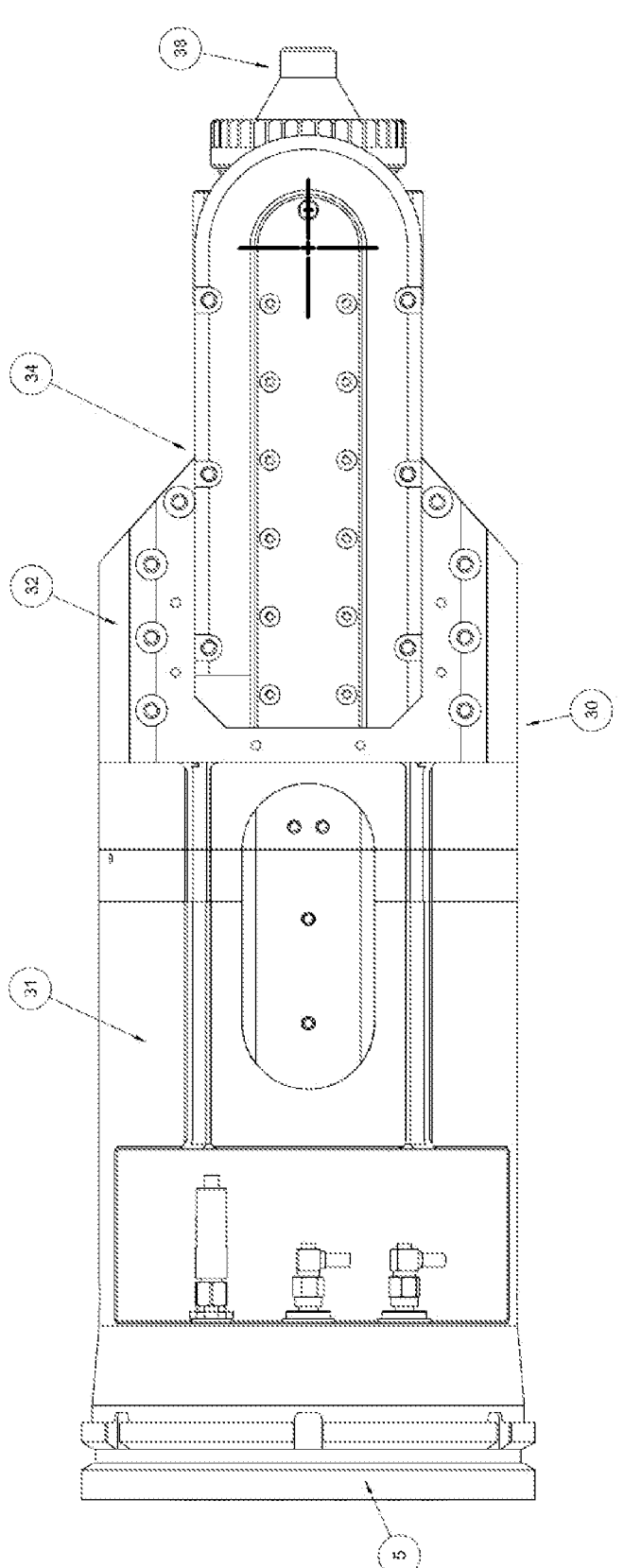
Figure 2C:
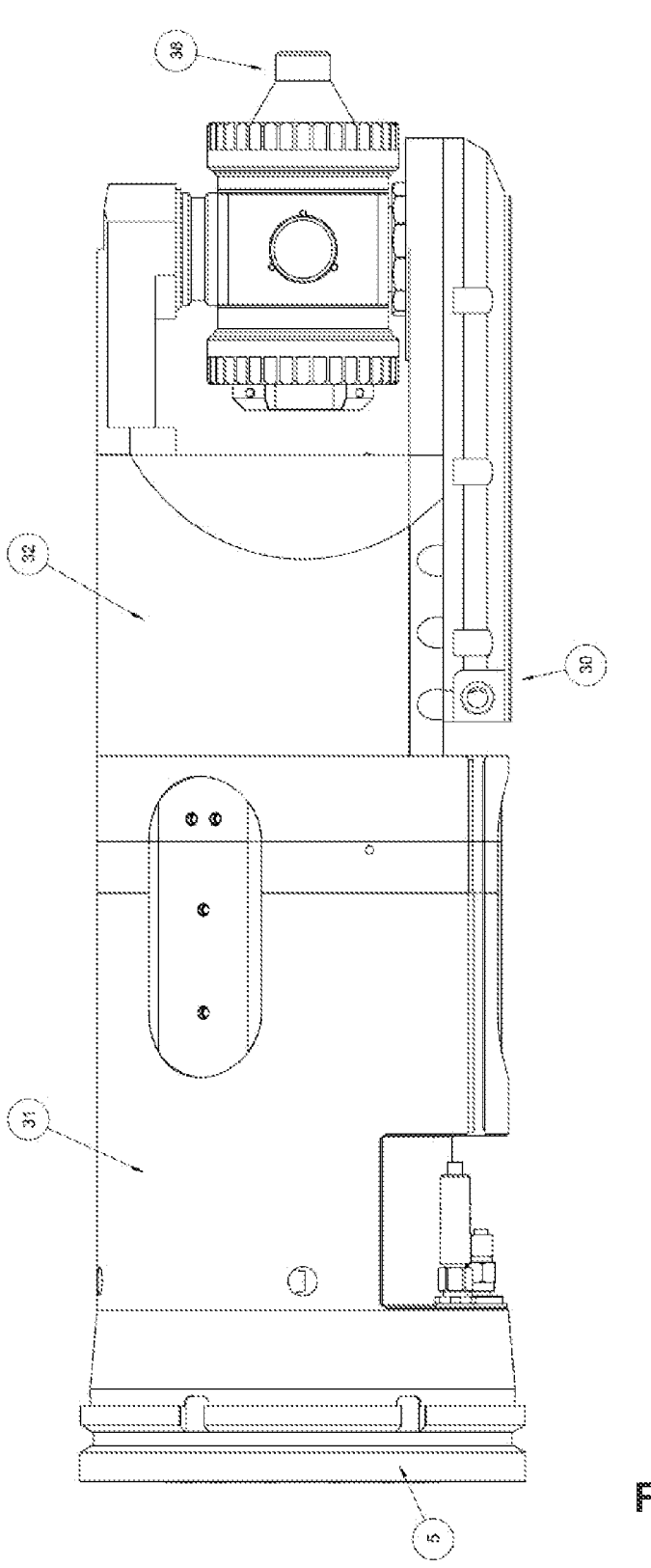

As can be seen in FIG. 1 and in detail in FIGS. 2A to 2C, the change-over device 26 has a change-over adapter 5, on which a tool 30 (not visible in FIG. 1) for non-destructively testing the fibre-reinforced plastic component is mounted. The tool 30 has a cylindrical motor housing 31 which is coaxially adjacent to the change-over adapter 5 and is connected to the change-over adapter 5 detachably and for conjoint rotation therewith. A motor, in particular a servo-motor, is arranged in the motor housing 31. On one side of the motor housing 31, opposite the change-over adapter 5 when the tool 30 is mounted, the tool 30 has a cylindrical gear housing 32, which is arranged coaxially with the cylindrical motor housing 31. In the gear housing 32 there is a gearing mechanism, which is connected to the servo-motor and converts torques and/or rotation speeds generated by the servomotor. On a side 34 of the gear housing 32 opposite the motor housing 31 there is a tool head 35, which is mounted rotatably about a transverse axis 36A on a holder 36 fastened to the gear housing 32. With the aid of the servomotor, the tool head 35 can be rotated about the transverse axis 36A relative to the holder 36 (see arrow 36B in FIG. 2A). In the embodiment shown, the force of the motor is transmitted to the tool head 35 via a toothed belt in a toothed belt housing 31A.

The tool head 35 has an ultrasonic testing head 37 and a liquid nozzle 38, with which a water jet is directed at the component.

The tool 30 can be rotated using a further drive, for example of the manipulation element 28, about its longitudinal axis 30A, as shown with an arrow 30B in FIG. 2A. The liquid nozzle 38 can thus be rotated about its longitudinal or centre axis 46 when the transverse axis 36A is set to 0°, so the longitudinal axis 46 of the liquid nozzle 38 runs parallel to the longitudinal axis 30A of the tool 30. The rotations about the longitudinal axis 30A and the transverse axis 36A can also be carried out at the same time as one another.

Figure 5:
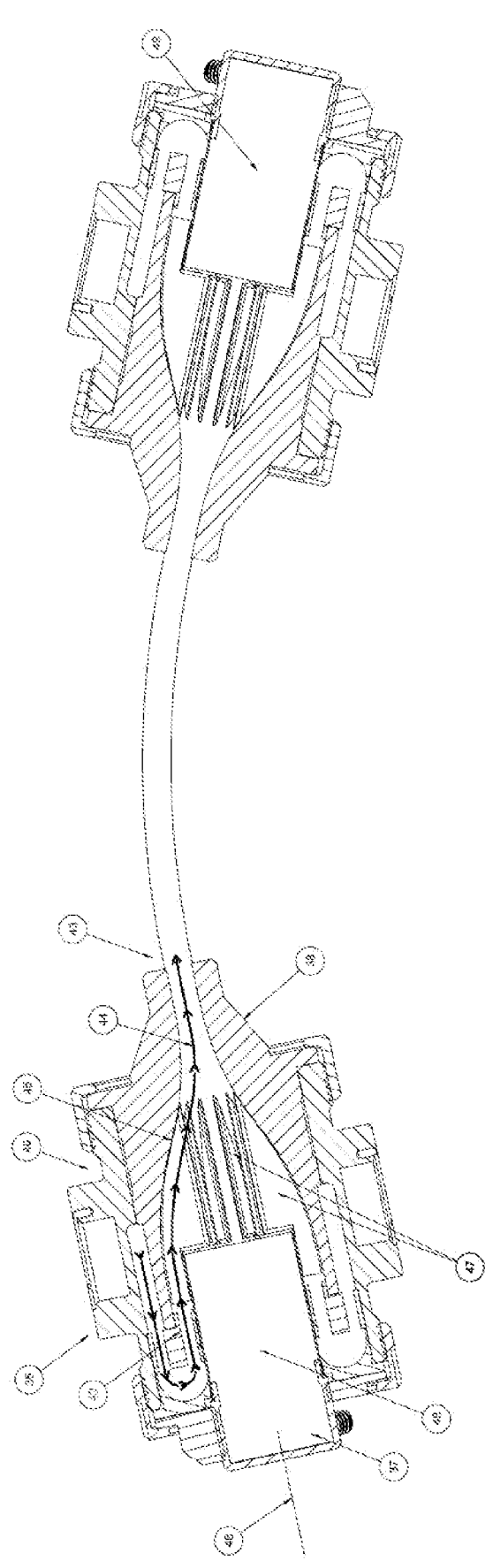

FIGS. 3 to 5 show an embodiment according to the invention of the tool head 35, which in the embodiment shown has a receiving housing 40 on which the ultrasonic testing head 37 and the liquid nozzle 38 are mounted. The drawing also shows an ultrasonic probe 48 which corresponds to the tool head 35 and has a receiver transducer 49, with which ultrasonic waves passing through the component (not shown) are received. The incident waves are converted into an electrical signal, which is evaluated electronically.

The tool head 35 has a liquid supply 41 for supplying liquid via the bearing of the receiving housing 40. With the water supply 41, a liquid flow, in particular water, is supplied to an annular feed between the receiving housing 40 and the outside of the liquid nozzle 38, deflected with a deflecting ring, and guided to a liquid inlet 42 of the liquid nozzle 38. The liquid inlet 42 extends in a ring on the rear of the liquid nozzle 38. The inflow of the liquid flow is made laminar by the annular liquid inlet 42. On the front end on the side facing away from the ultrasonic testing head or transducer 37, the liquid nozzle 38 has a liquid outlet 43, with which the liquid flow is directed at the component during non-destructive ultrasonic testing. The liquid flow inside the liquid nozzle 38 is shown in FIG. 5 using a line 44.

As can be seen in FIG. 5, the flow space inside the liquid nozzle 38, also referred to as a "squirter nozzle", is delimited by a smooth inner surface 45, which tapers continuously from the liquid inlet 42 to the liquid outlet 43. In the embodiment shown, the inner surface 45 of the liquid nozzle 38 is curved according to a spline polynomial of degree 3 to 5. The flow cross-section of the liquid flow inside the liquid nozzle 38 thus decreases in the direction of the liquid flow. The inner surface 45 is rotationally symmetrical in relation to a centre axis 46 of the liquid nozzle 38. The direction information such as "axial" and "radial" relates to the centre axis 46 of the liquid nozzle 38.

As can also be seen in FIG. 5, the liquid nozzle 38 has multiple liquid-guiding ribs or protrusions 47, which protrude inwards in the radial direction from the inner surface 45 of the liquid nozzle 38 towards the centre axis 46 and extend in the axial direction. The inner longitudinal edges 48 of the liquid-guiding ribs 47 end at an outer edge region, as seen in the radial direction, of the flow space in front of the ultrasonic testing head 37. The central region around the centre axis 46 is thus free of liquid-guiding ribs 47, and therefore the ultrasonic signal can propagate freely in the central region, and disruptive reflections are avoided. The liquid-guiding ribs 47 are arranged at regular angular intervals in the circumferential direction on the inner surface 45 of the liquid nozzle 38. At least four, preferably at least six, particularly preferably at least eight, in particular at least ten liquid-guiding ribs 47 can be provided.

As can also be seen in FIG. 5, the height of the liquid-guiding ribs 47, i.e., their radial extent decreases in the axial direction towards the liquid outlet 43, so that the inner longitudinal edges 48 of the liquid-guiding ribs 47 run substantially parallel to one another. The liquid-guiding ribs 47 peter out before the liquid outlet 43, so that the portion adjacent to the liquid outlet 43 is free of liquid-guiding ribs 47.

The invention claimed is:

1. An ultrasonic testing device for non-destructively testing a component, having:

an ultrasonic testing head, a liquid nozzle with a liquid inlet, a liquid outlet, and an inner surface which tapers towards the liquid outlet, wherein the liquid nozzle has multiple liquid-guiding ribs, which protrude inwards from the tapering inner surface of the liquid nozzle into a sound chamber in front of the ultrasonic testing head, a height of the liquid-guiding ribs decreases towards the liquid outlet, and the inner longitudinal edges of the liquid-guiding ribs run substantially parallel to one another.

2. The ultrasonic testing device according to claim 1, wherein the liquid-guiding rib extends from the tapering inner surface into an edge region on the front of the ultrasonic testing head, wherein a central region on the front of the ultrasonic testing head is free of the liquid-guiding rib.

3. The ultrasonic testing device according to claim 1, wherein inner longitudinal edges of the liquid-guiding ribs are arranged at a distance from one another, so that the liquid nozzle has a central region free of liquid-guiding ribs.

4. The ultrasonic testing device according to claim 1, wherein the liquid-guiding ribs are arranged at regular angular intervals in a circumferential direction on the tapering inner surface of the liquid nozzle.

5. The ultrasonic testing device according to claim 1, wherein the tapering inner surface of the liquid nozzle adjacent to the liquid outlet is free of liquid-guiding ribs.

6. The ultrasonic testing device according to claim 1, wherein the inner surface of the liquid nozzle is tapered according to a spline polynomial of degree 3 to 5.

7. The ultrasonic testing device according to claim 1, wherein the liquid nozzle has an axial extent of less than 60 mm from a center of the ultrasonic testing device to the liquid outlet.

8. The ultrasonic testing device according to claim 1, wherein a drive is provided to move the liquid nozzle, to rotate the liquid nozzle about its longitudinal axis and/or a transverse axis running perpendicular thereto.

9. The ultrasonic testing device according to claim 1, wherein the component is a fibre-reinforced plastic component.

10. A testing system having a manipulation element, having a robot arm, on which a tool having an ultrasonic testing device is arranged, the device having an ultrasonic testing head, a liquid nozzle with a liquid inlet, a liquid outlet, and an inner surface which tapers towards the liquid outlet wherein the liquid nozzle has multiple liquid-guiding ribs which protrude inwards from the tapering inner surface of the liquid nozzle into a sound chamber in front of the ultrasonic testing head, wherein a height of the liquid-guiding ribs decreases towards the liquid outlet, and wherein the inner longitudinal edges of the liquid-guiding ribs run substantially parallel to one another.

11. A method for non-destructively testing a component, having the steps of:

providing an ultrasonic testing device having an ultrasonic testing head, a liquid nozzle with a liquid inlet, a liquid outlet, and an inner surface which tapers towards the liquid outlet wherein the liquid nozzle has multiple liquid-guiding ribs which protrude inwards from the tapering inner surface of the liquid nozzle into a sound chamber in front of the ultrasonic testing head, wherein a height of the liquid-guiding ribs decreases towards the liquid outlet, and wherein the inner longitudinal edges of the liquid-guiding ribs run substantially parallel to one another, generating ultrasonic waves using the ultrasonic testing head, supplying a liquid flow into the liquid nozzle via the liquid inlet, conducting the liquid flow along the inner surface of the liquid nozzle to the liquid outlet, wherein the liquid flow is guided with the aid of the liquid-guiding rib.

12. The method according to claim 11, comprising:

rotating the liquid nozzle, about its own axis, while the liquid flow is conducted along the inner surface of the liquid nozzle to the liquid outlet, so that the liquid flow is carried over the liquid-guiding rib during the rotary movement.

13. The method according to claim 11, wherein the component is a fibre-reinforced plastic component.

* * * * *